United States Patent
Yamamoto et al.

(10) Patent No.: US 10,636,153 B2
(45) Date of Patent: Apr. 28, 2020

(54) IMAGE PROCESSING SYSTEM, IMAGE PROCESSING APPARATUS, AND IMAGE PROCESSING METHOD FOR OBJECT TRACKING

(71) Applicant: FUJITSU LIMITED, Kawasaki-shi, Kanagawa (JP)

(72) Inventors: Takaya Yamamoto, Yokohama (JP); Kazuo Sasaki, Kobe (JP); Daisuke Abe, Fukuoka (JP); Mari Iwasaki, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 264 days.

(21) Appl. No.: 15/788,016

(22) Filed: Oct. 19, 2017

(65) Prior Publication Data
US 2018/0144486 A1 May 24, 2018

(30) Foreign Application Priority Data
Nov. 22, 2016 (JP) .................................. 2016-227165

(51) Int. Cl.
G06T 7/292 (2017.01)
G06T 7/254 (2017.01)
G06T 7/11 (2017.01)
G06T 7/174 (2017.01)

(52) U.S. Cl.
CPC ............... *G06T 7/292* (2017.01); *G06T 7/11* (2017.01); *G06T 7/174* (2017.01); *G06T 7/254* (2017.01); G06T 2207/10016 (2013.01); G06T 2207/20224 (2013.01); G06T 2207/30196 (2013.01); G06T 2207/30232 (2013.01); G06T 2207/30241 (2013.01)

(58) Field of Classification Search
None
See application file for complete search history.

(56) References Cited

U.S. PATENT DOCUMENTS

| 2005/0254686 | A1 | 11/2005 | Koizumi |
| 2007/0070201 | A1* | 3/2007 | Yokomitsu .............. G06T 7/246 348/169 |
| 2015/0146921 | A1 | 5/2015 | Ono et al. |
| 2019/0220673 | A1* | 7/2019 | Ikeda ................. G06K 9/00342 |

FOREIGN PATENT DOCUMENTS

| JP | 2004-96402 | 3/2004 |
| JP | 2009-143722 | 7/2009 |
| JP | 2010-199701 | 9/2010 |
| WO | 2013/108686 A1 | 7/2013 |

* cited by examiner

*Primary Examiner* — Justin P. Misleh
(74) *Attorney, Agent, or Firm* — Staas & Halsey LLP

(57) ABSTRACT

A camera, a storage device, and an image processing apparatus are included. The storage device stores a plurality of captured images that are captured by the camera. The image processing apparatus estimates a region of an object included in a captured image of a current time based on a captured image of a previous time, for each of multiple objects included in the captured image of the current time. The image processing apparatus evaluates whether to correct the estimated region of each object based on a combination region in which the estimated regions of the respective objects are combined, and on a difference region that is identified by a background image and the captured image of the current time. The image processing apparatus corrects the estimated regions of the respective objects based on a result of evaluation.

15 Claims, 18 Drawing Sheets

FIG.3

| CAMERA IDENTIFICATION NUMBER | TIME | IMAGE DATA |
|---|---|---|
| 5a | t1 | IMAGE DATA OF TIME t1 |
|  | t2 | IMAGE DATA OF TIME t2 |
|  | t3 | IMAGE DATA OF TIME t3 |
|  | t4 | IMAGE DATA OF TIME t4 |
|  | ... | |
| 5b | ... | |

FIG.4

| CAMERA IDENTIFICATION NUMBER | TIME | PERSON IDENTIFICATION INFORMATION | POSITION COORDINATES | PERSON REGION |
|---|---|---|---|---|
| 5a | t1 | 10a | xa1, ya1 | REGION a1 |
| | | 10b | xb1, yb1 | REGION b1 |
| | | 10c | xc1, yc1 | REGION c1 |
| | t2 | 10a | xa2, ya2 | REGION a2 |
| | | 10b | xb2, yb2 | REGION b2 |
| | | 10c | xc2, yc2 | REGION c2 |
| | t3 | 10a | xa3, ya3 | REGION a3 |
| | | 10b | xb3, yb3 | REGION b3 |
| | | 10c | xc3, yc3 | REGION c3 |
| | ⋮ | | | |

| REGION IDENTIFICATION INFORMATION | POSITION COORDINATES | Eval VALUE |
|---|---|---|
| COMBINATION REGION A | POSITION COORDINATES OF EACH PERSON INCLUDED IN COMBINATION REGION A | ○○○○ |
| COMBINATION REGION B | POSITION COORDINATES OF EACH PERSON INCLUDED IN COMBINATION REGION B | ○○○○ |
| COMBINATION REGION C | POSITION COORDINATES OF EACH PERSON INCLUDED IN COMBINATION REGION C | ○○○○ |
| ... | | |

FIG.6

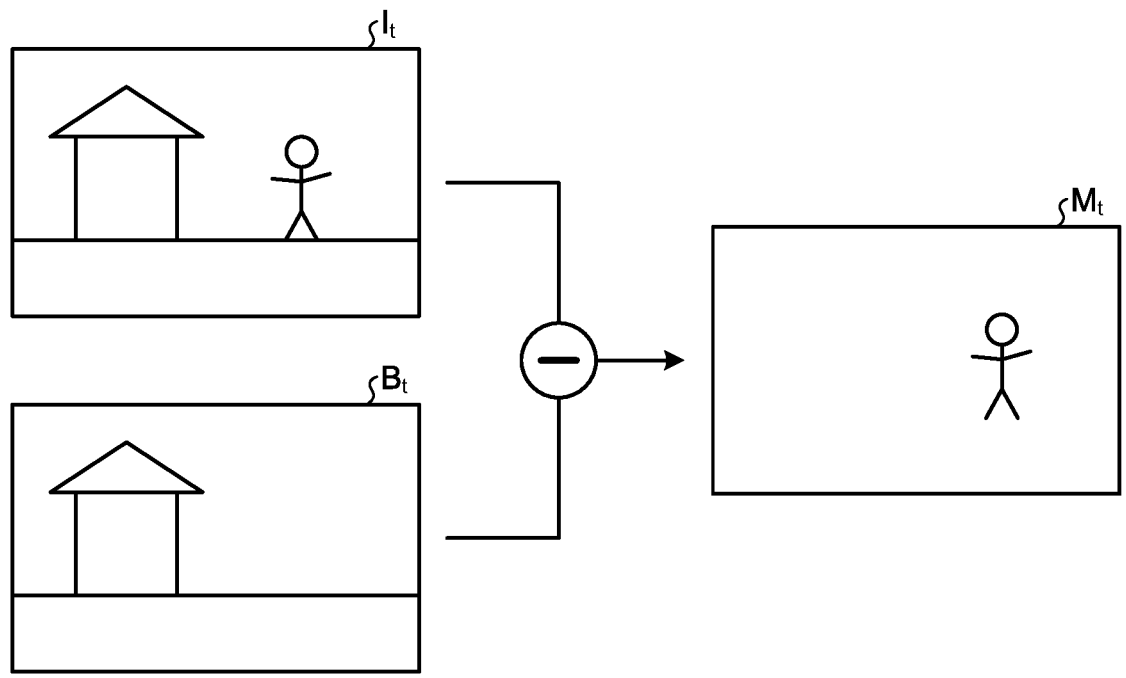

IMAGE PROCESSING SYSTEM, IMAGE PROCESSING APPARATUS, AND IMAGE PROCESSING METHOD FOR OBJECT TRACKING

CROSS-REFERENCE TO RELATED APPLICATION

This application is based upon and claims the benefit of priority of the prior Japanese Patent Application No. 2016-227165, filed on Nov. 22, 2016, the entire contents of which are incorporated herein by reference.

FIELD

The embodiments discussed herein are related to an image processing system, and the like.

BACKGROUND

In recent years, with widespread of surveillance cameras, there have been demands for determination of information such as the number of people in a captured image, an amount of movement, and a moving path in addition to a position of a person in the captured image taken by a surveillance camera. Not just for monitoring commercial facilities, the determined information can be used also in the field of sport.

As in a captured image of a surveillance camera installed in facilities such as a shopping mall and a gymnasium, an indefinite number of people are often included, and the people can be overlapped therein, it is difficult to track each person.

As techniques to deal with the above problem, for example, a first related art, a second related art and a third related art have been available. The first related art discloses a technique in which multiple cameras are installed on a ceiling to avoid overlapping of people, a head of each person is recognized, and a position of each person is identified based on the principle of stereoscopy.

The second related art discloses a technique of generating tracking information by chronologically connecting a person in images imaged by multiple cameras, and based on statistical information made on the precondition that a speed and a moving direction of a person can put to some extent into patterns.

The third related art discloses a technique of tracking each object by using a template called synthesis feature amount that has been prepared according to an overlapping state, and by distinguishing each of overlapped objects.

SUMMARY

According to an aspect of an embodiment, an image processing system includes: a camera; a storage device; and an image processing apparatus, wherein the storage device stores a plurality of captured images that are captured by the camera, and the image processing apparatus includes: a processor that executes a process including: estimating a region of an object included in captured image of a current time for each of a plurality of objects included in the captured image of the current time based on captured image of a previous time, the captured image of the current time and the captured image of the previous time being acquired from the storage device, evaluating whether to correct each of the regions of the objects estimated by the estimating, based on a combination region in which the respective regions of objects estimated by the estimating are combined, and on a difference region that is identified from a background image and the captured image of the current time, and correcting the respective regions of the objects estimated by the estimating based on a result of evaluation by the evaluating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts one example of a data structure of image information;

FIG. 4 depicts one example of a data structure of a tracking table;

FIG. 5 depicts one example of a data structure of a recalculation table;

FIG. 6 is diagram (1) for explaining background subtraction;

DESCRIPTION OF EMBODIMENTS

With the conventional techniques described above, highly accurate tracking of more than one object has not been possible.

For example, with the technique disclosed in Japanese Laid-open Patent Publication No. 2009-143722, it is possible to count the number of people, but is difficult to perform accurate tracking during busy hours or the time when people go back and forth, because a part of body having little feature amount as head is used therefor.

The technique disclosed in Patent Literature of International Publication Pamphlet No. WO 2013/108686 is based on the precondition that a speed or a moving direction of people can put to some extent into patterns. However, as movement of a person at a crowded place or movement of people playing a sport are often not consistent, and the accuracy of tracking information is degraded.

In the technique disclosed in Japanese Laid-open Patent Publication No. 2004-096402, the quantity of the synthesis feature amount increases when multiple postures of a person are assumed or when the number of people is large. Therefore, it is difficult to prepare the feature amounts that cover all patterns, and is difficult to track more than one object accurately.

Preferred embodiments of the present invention will be explained with reference to accompanying drawings. The embodiments are not intended to limit the present invention.

[a] First Embodiment

Figure 1:
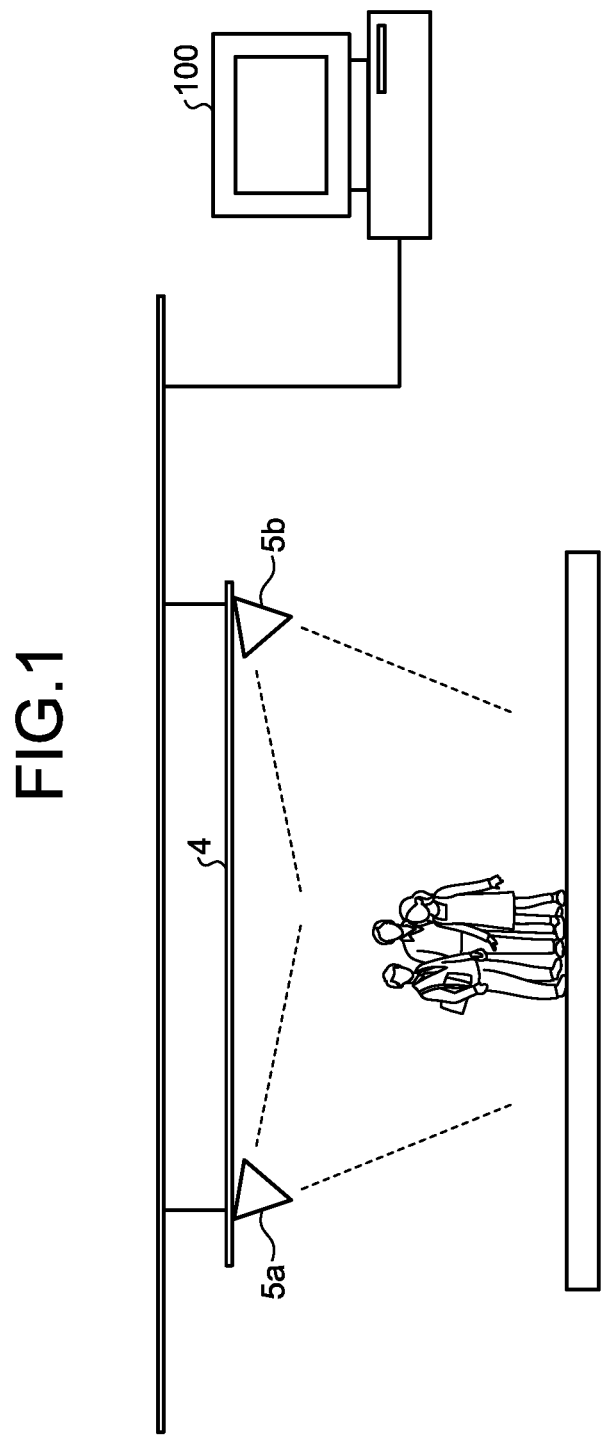
FIG. 1 depicts one example of an image processing apparatus according to a first embodiment.

FIG. 1 depicts one example of an image processing apparatus according to a first embodiment. As depicted in FIG. 1, an image processing apparatus 100 is connected to cameras 5a and 5b that are set on a ceiling 4. The cameras 5a, 5b output information of an image of an imaging range to the image processing apparatus 100. In the following explanation, the cameras 5a and 5b are collectively denoted as camera 5 as appropriate. Moreover, the information of an image is denoted as image information. The image information includes multiple pieces of image data that are chronologically arranged. The image data includes information of a still image that has been imaged by the camera 5 at certain timing.

Figure 2:
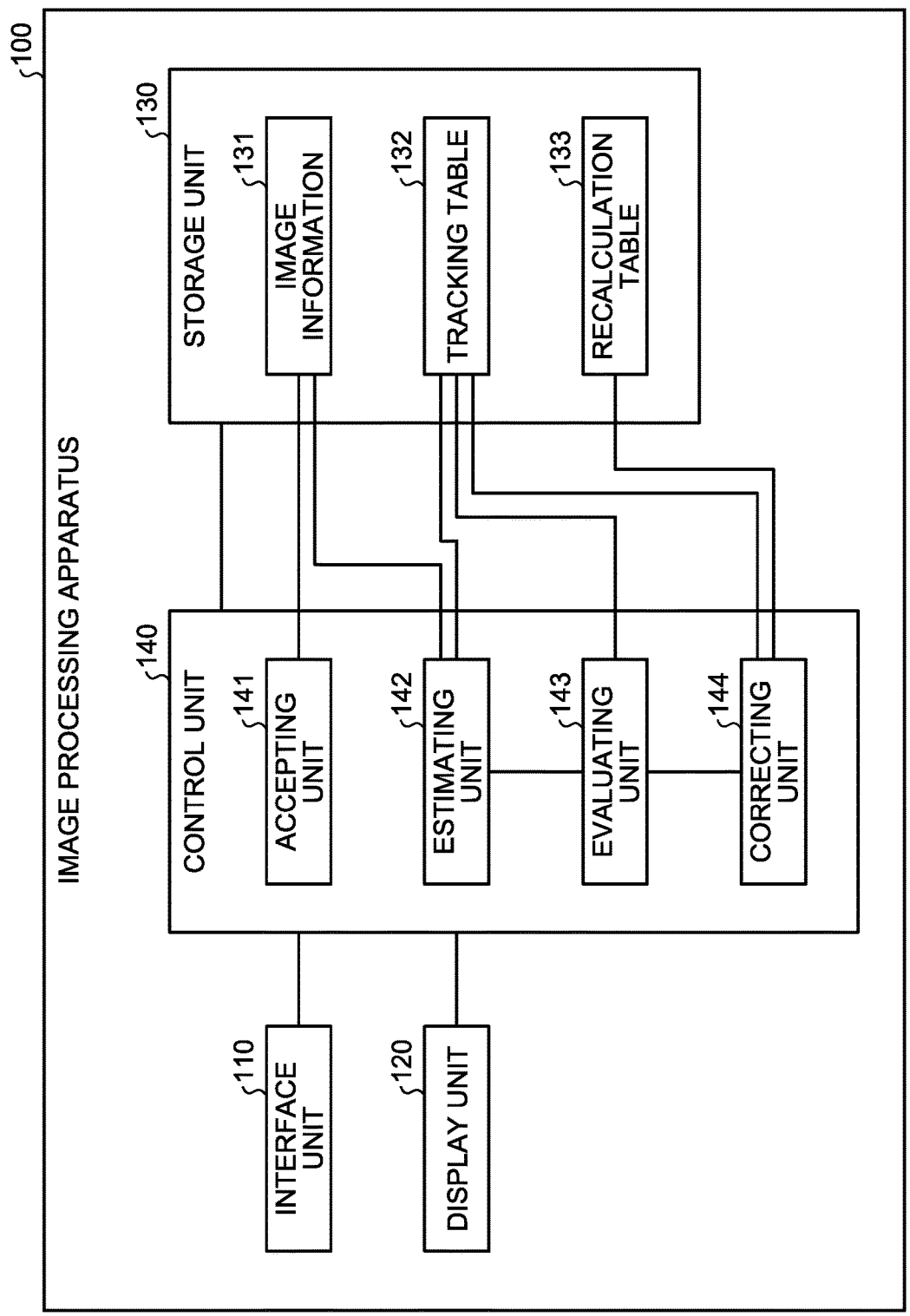
FIG. 2 is a functional block diagram depicting a configuration of the image processing apparatus according to the first embodiment.

The image processing apparatus 100 is a processing unit that tracks a position of each user that is included in the image information by performing image processing on the image information acquired from the camera 5. FIG. 2 is a functional block diagram depicting a configuration of the image processing apparatus according to the first embodiment. As depicted in FIG. 2, the image processing apparatus 100 includes an interface unit 110, a display unit 120, a storage unit 130, and a control unit 140.

The interface unit 110 is a processing unit that is connected to various external devices, and that performs data communication. For example, the interface unit 110 is connected to the camera 5 depicted in FIG. 1, and acquires the image information from the camera 5. The interface unit 110 outputs the image information to the control unit 140. The interface unit 110 can be connected also to an input device such as a keyboard, and can accept information that is input by a user.

The display unit 120 is a display device that displays information output from the control unit 140. For example, the display unit 120 corresponds to a liquid crystal display, a touch panel, or the like.

The storage unit 130 has image information 131, a tracking table 132, and a recalculation table 133. The storage unit 130 corresponds to a semiconductor memory device, such as a random-access memory (RAM), a read-only memory (ROM), and a flash memory, or a storage device, such as a hard disk drive (HDD).

The image information 131 corresponds to image information that has been acquired by the camera 5. FIG. 3 depicts one example of a data structure of the image information. As depicted in FIG. 3, the image information 131 associates a camera identification number with time and image data. The camera identification number is information to identify a camera uniquely. The time indicates a time when image data is captured by the camera. The image data indicates image data that is captured by a corresponding camera at a corresponding time.

The tracking table 132 is a table that holds information about a position of each person at each time. FIG. 4 depicts one example of a data structure of the tracking table. As depicted in FIG. 4, the tracking table associates the camera identification number with a time, a person identification information, position coordinates, and a person region. Explanation of the camera identification number and the time is the same as the explanation of the camera and the time in FIG. 3.

The person identification information is information to identify a person included in image data that is imaged at a corresponding time uniquely. The position coordinates indicate coordinates of a center of gravity of a person imaged at a corresponding time. The person region indicates a region of a person included in image data that is imaged at a corresponding time. Although explanation is omitted, the person region can be expressed by upper left coordinates and lower right coordinates of a region of a person.

The recalculation table 133 is a table that is used by a correcting unit 144 described later. FIG. 5 depicts one example of a data structure of the recalculation table. As depicted in FIG. 5, the recalculation table 133 associates region identification information with a position coordinate and an Eval value.

The region identification information is information to identify a region combining respective person regions uniquely. In the following explanation, the region combining respective person regions is expresses as "combination region". The position coordinate indicates position coordinates of each person included in the combination region. The Eval value is a parameter that indicates appropriateness of a corresponding combination region. Specific explanation of the Eval value is given later.

The control unit 140 includes an accepting unit 141, an estimating unit 142, an evaluating unit 143, and the correcting unit 144. The control unit 140 can be implemented by a central processing unit (CPU), a micro processing unit (MPU), or the like. Moreover, the control unit 140 can also be implemented by a hardwired logic, such as an application specific integrated circuit (ASIC) and a field programmable gate array (FPGA).

The accepting unit 141 is a processing unit that accepts the image information 131 from the camera 5 through the interface unit 110. The accepting unit 141 stores the accepted image information 131 in the storage unit 130. When accepting new image information from the camera 5, the accepting unit 141 adds the accepted new image information to the image information 131.

The estimating unit 142 is a processing unit that estimates a position of a person at a time t based on the image information 131 and the tracking table 132. The estimating unit 142 performs background subtraction, calculation of an estimation position, and evaluation of the estimation position, sequentially.

Figure 7:
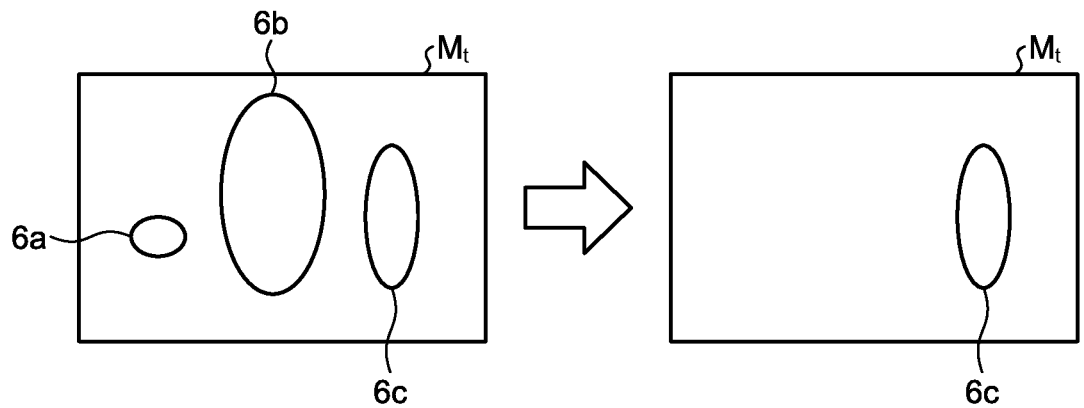
FIG. 7 is diagram (2) for explaining the background subtraction.

One example of the background subtraction performed by the estimating unit 142 is explained. FIG. 6 and FIG. 7 are diagrams for explaining the background subtraction. As depicted in FIG. 6, the estimating unit 142 gets a difference between image data $I_t$ and background image $B_t$ of a time t, to generate difference image $M_t$. The estimating unit 142 acquires the image data $I_t$ at time t from the image information 131. The estimating unit 142 uses image data that has been prepared in advance as the background image $B_t$.

For example, coordinates (u, v) of the difference image $M_t$ is defined by Equation (1). In Equation (1), $I_t(u, v)$ indicates a pixel value at the coordinates (u, v) of the image data $I_t$. $B_t(u, v)$ indicates a pixel value at the coordinates (u, v) of the background image $B_t$.

$$M_t(u,v) = |I_t(u,v) - B_t(u,v)| \quad (1)$$

Just by getting a difference between the image data $I_t$ and the background image $B_t$, a region other than person regions can be left in the difference image $M_t$. Therefore, the estimating unit 142 compares each region left in the difference image $M_t$ with a predetermined person size, and identifies a region having a similar size to the predetermined person size is identified as a candidate of a person. For example, the estimating unit 142 identifies a region that a difference between the predetermined person size and the size of the region left in the difference image $M_t$ is smaller than a threshold as a person region candidate.

In the example depicted in FIG. 7, regions 6a, 6b, and 6c are included in the difference image $M_t$. For example, the estimating unit 142 compares the sizes of the regions 6a, 6b, and 6c with a predetermined person size. Out of these, a difference between the regions 6a to 6b and the predetermined person size is equal to or larger than a threshold, and a difference between the size of the region 6c and the predetermined person size is smaller than the threshold. In this case, the estimating unit 142 defines the region 6c as a person region candidate. In the following explanation, the person region candidate defined by the background subtraction explained in FIG. 7 is denoted as a "first candidate region" appropriately. In the example depicted in FIG. 7, the region 6c is the first candidate region.

Figure 8:
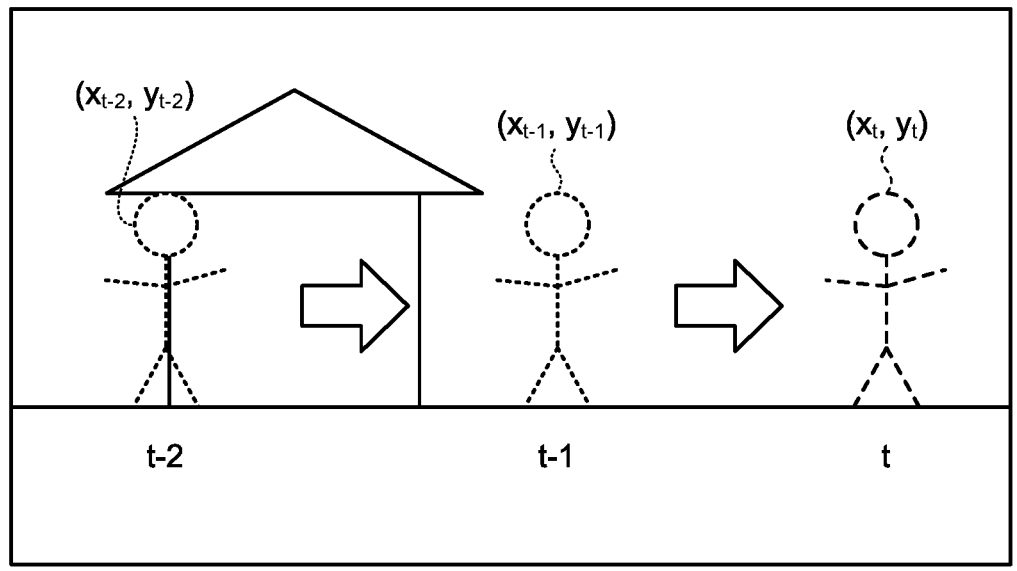
FIG. 8 is a diagram for explaining calculation of an estimation position.

Subsequently, calculation of an estimation position performed by the estimating unit 142 is explained. FIG. 8 is a diagram for explaining the calculation of an estimation position. FIG. 8 depicts an example of calculating an estimation position of a person at time t based on position coordinates of the person at time t-1 and time t-2 as one example. The estimating unit 142 acquires information of the position coordinates of the person at time t-1 and time t-2 from the tracking table 132.

For example, the position coordinates of the person at time t-1 are $(x_{t-1}, y_{t-1})$, and the position coordinates of the person at time t-2 are $(x_{t-2}, y_{t-2})$. The estimating unit 142 identifies a movement vector from time t-2 to time t-1. The estimating unit 142 defines coordinates at a destination of the movement vector with respect to the position coordinates $(x_{t-1}, y_{t-1})$ as an estimation position $(x_t, y_t)$ of the person at time t.

The processing of defining an estimation position of a person at time t can be performed by using a technique such as the Kalman filter disclosed in Japanese Laid-open Patent Publication No. 2010-199701 and the optical flow.

Figure 9:
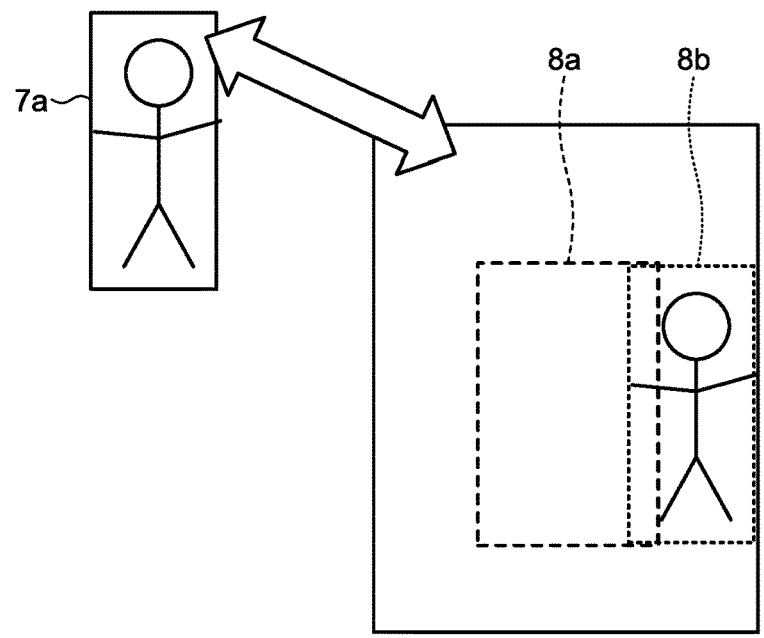
FIG. 9 is a diagram for explaining evaluation of an estimation position.

Subsequently, evaluation of an estimation position performed by the estimating unit 142 is explained. FIG. 9 is a diagram for explaining the evaluation of an estimation position. The estimating unit 142 compares an image at a position of a person of time t-1 and an image at an estimation position of time t, and evaluates whether the images are similar to each other. The image at the position of the person of time t-1 corresponds to an image of the person region of time t-1 in image data of time t-1. The position at the estimation position of time t is an image of a predetermined range with respect to the estimation position $(x_t, y_t)$ in the image data of time t. The predetermined range is determined in advance.

The estimating unit 142 calculates a similarity e between the image at the position of the person and the image at the estimation position of time t based on Equation (2). $f_t(x+m, y+n)$ indicates a pixel value at coordinates (x+m, y+n) in the image at the estimation position of time t. $f_t(x+m-i, y+n-j)$ indicates a pixel value at coordinates (x+m-i, y+n-j) in the image of the person region of time t-1. For i and j, predetermined values are substituted.

$$e_B(x, y) = \sum_{m=0}^{m-1} \sum_{n=0}^{n-1} |f_t(x+m, y+n) - f_{t-1}(x+m-i, y+n-j)| \quad (2)$$

The estimating unit 142 determines that the image at the position of the person of time t-1 and the image at the estimation position of time t are similar to each other when the similarity e is equal to or higher than a threshold. On the other hand, the estimating unit 142 determines that the image at the position of the person of time t-1 and the image at the estimation position of time t are not similar to each other when the similarity e is lower than the threshold.

When the similarity e is lower than the threshold, the estimating unit 142 displaces the estimation position of time t, and recalculates the similarity e. The estimating unit 142 repeats the above processing until the similarity e equal to or higher than the threshold is obtained.

When the similarity e is equal to or higher than the threshold, the estimating unit 142 defines the estimation position of time t as a tentative position of a person at time t.

In FIG. 9, the image at the position of the person of time t-1 is an image 7a, and the image at the estimation position of time t is an image 8a. The estimating unit 142 calculates a similarity $e_1$ between the image 7a and the image 8a. For example, when the similarity $e_1$ is lower than the threshold, the estimating unit 142 displaces the estimation position of time t, and determines the image at the estimation position of time t to an image 8b. The estimating unit 142 calculates a similarity $e_2$ between the image 7a and the image 8b. When the similarity $e_2$ is equal to or higher than the threshold, the position (center of gravity) of the image 8b is defined as the tentative position of the person at time t.

When more than one person is included in the image information 131, the estimating unit 142 performs the background subtraction, the calculation of an estimation position, and the evaluation of the estimation position for each person, and defines the tentative position of each person. The estimating unit 142 outputs information of the first candidate region, and information of the tentative position of each person at time t to the evaluating unit 143.

Explanation returns to FIG. 2. The evaluating unit 143 is a processing unit that evaluates whether a tentative position of each person of time t is at an appropriate position. When evaluating that a tentative position of each person is at an appropriate position, the evaluating unit 143 registers the tentative position of each person of time t in the tracking table 132 as position coordinates. On the other hand, when evaluating that a tentative position of each person is not at an appropriate position, the evaluating unit 143 outputs information of the tentative position of each person of time t, and information of the first candidate region of each person to the correcting unit 144.

One example of the processing of the evaluating unit 143 is explained. The evaluating unit 143 calculates a first overlap rate of a first combination region in which the first candidate regions of each person are combined and a second combination region in which person regions according to the tentative position of each person are combined. For example, the first overlap rate is calculated based on Equation (3). As in Equation (3), it is indicated that as the first overlap rate increases, the less OR(Sx) and OR Ex) overlap with each other.

$$\text{First Overlap Rate}=\text{abs}\{\text{OR}(Sx)-\text{OR}(Ex)\} \quad (3)$$

In Equation (3), OR(Sx) expresses the first combination region, and OR(Ex) expresses the second combination region.

Figure 10:
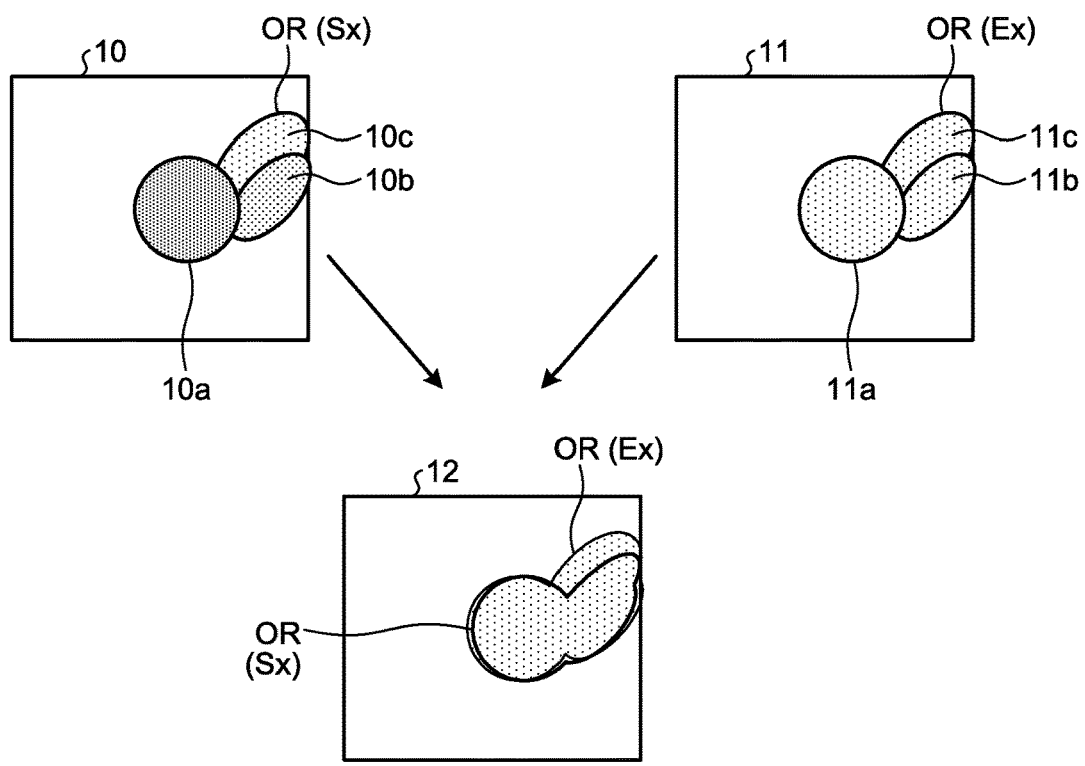
FIG. 10 is a diagram for explaining processing performed by an evaluating unit.

FIG. 10 is a diagram for explaining the processing performed by the evaluating unit. In an image 10 in FIG. 10, a region 10*a* is the first candidate region of person A. A region 10*b* is the first candidate region of person B. A region 10*c* is the first candidate region of person C. A region obtained by combining (the number of pixels obtained by ORing) these regions 10*a*, 10*b*, and 10*c* corresponds OR(Sx).

Figure 11:
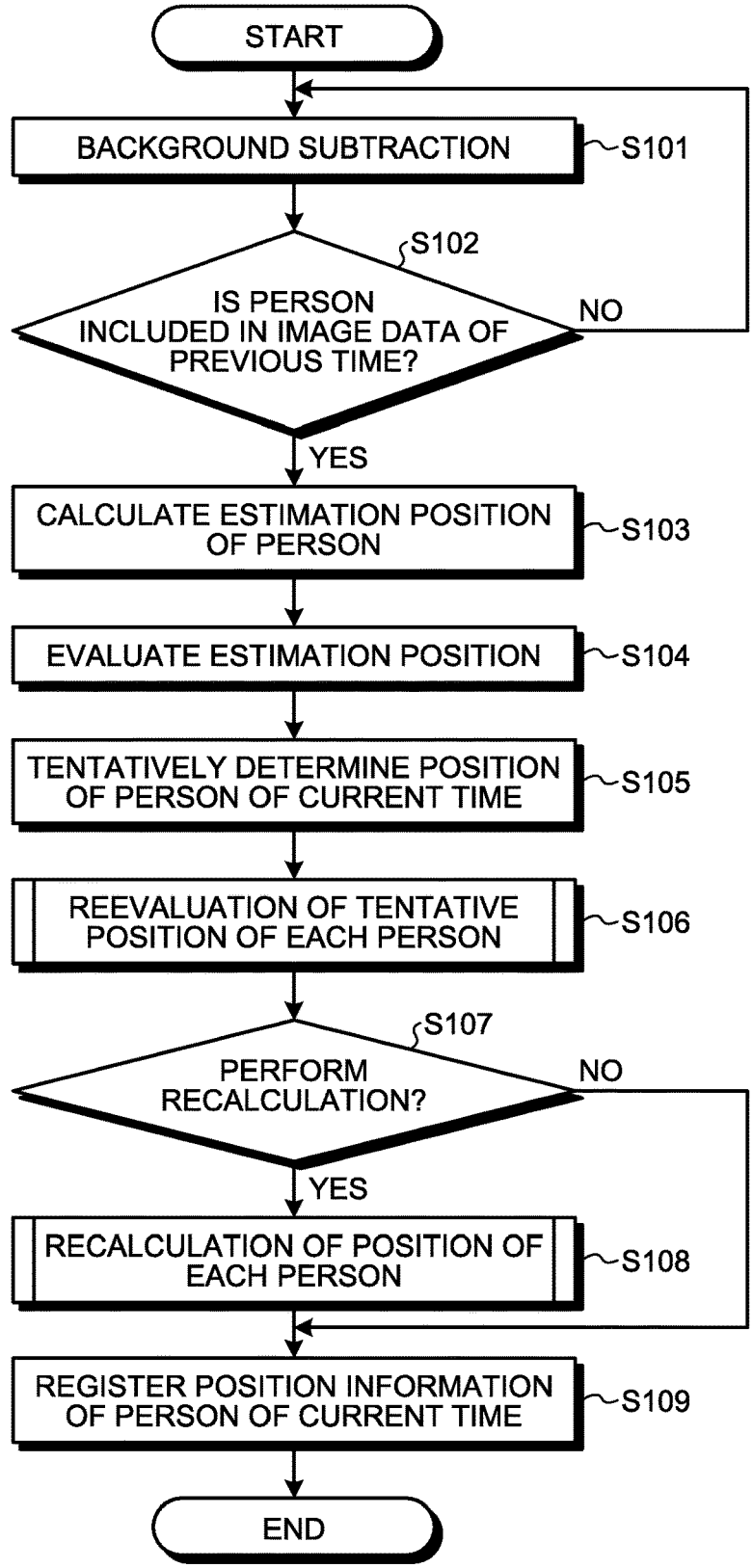
FIG. 11 is a flowchart indicating a procedure of processing performed by the image processing apparatus according to the first embodiment.

In an image 11 in FIG. 11, a region 11*a* is a person region based on a tentative position of person A. A region 11*b* is a person region based on a tentative position of person B. A region 11*c* is a person region based on a tentative position of person C. A region obtained by combining these regions 11*a*, 11*b*, and 11*c* (the number of pixels obtained by ORing) corresponds to OR(Ex).

In an image 12 in FIG. 10, the number of pixels in a region in which OR(Sx) and OR(Ex) are not overlapped with each other is the first overlap rate.

When the first overlap rate is lower than a predetermined overlap rate, the evaluating unit 143 evaluate that the tentative position of each person is at an appropriate position. On the other hand, when the first overlap rate is equal to or higher than the predetermined overlap rate, the evaluating unit 143 evaluates that the tentative position of each person is not at an appropriate position. The predetermined overlap rate is set in advance.

Explanation returns to FIG. 2. The correcting unit 144 is a processing unit that corrects a tentative position of each person when the evaluating unit 143 has evaluated that the tentative position is not at an appropriate position. For example, the correcting unit 144 identifies an estimation position of each person at which the Eval value indicated in Equation (4) is maximized, and corrects the tentative position to the identified estimation position.

$$\text{Eval value}=\text{Total Similarity}+\text{Second Overlap Rate} \quad (4)$$

A calculation example of the total similarity indicated in Equation (4) is explained. In the following explanation, a position to which a tentative position is displaced is denoted as modified estimation position. The correcting unit 144 calculates the similarity e between a person region of a person of time t-1 and a person region with respect to a modified estimation position of time t based on Equation (2). The correcting unit 144 calculates the similarity e per person, and calculates a similarity in which the similarities e of respective persons are totalized, as the total similarity.

For example, the total similarity when person A, person B, and person C are present is explained. The correcting unit 144 calculates a similarity $e_A$ between a person region of person A at time t-1 and a person region based on a modified estimation position of person A at time t based on Equation (2). The correcting unit 144 calculates a similarity $e_B$ between a person region of person B at time t-1 and a person region based on a modified estimation position of person B at time t based on Equation (2). The correcting unit 144 calculates a similarity $e_C$ between a person region of person C at time t-1 and a person region based on a modified estimation position of person C at time t based on Equation (2). The correcting unit 144 totalizes the similarities $e_A$, $e_B$, and $e_C$ to acquire the total similarity.

The calculation example of the second overlap rate indicated in Equation (4) is explained. The correcting unit 144 compares the first combination region in which the first candidate regions of time t are combined and a third combination region in which person regions according to modified estimation regions of each person, to calculate the second overlap rate. For example, the correcting unit 144 calculates the number of pixels in a region in which the first combination region and the third combination region overlap with each other as the second overlap rate.

The correcting unit 144 registers information of a modified estimation position and the Eval value in an associated manner in the recalculation table 133. For example, the information of the modified estimation position includes region identification information to identify the third combination region uniquely, and position coordinates of each person included in the third combination region.

The correcting unit 144 repeats the above processing while modifying the modified estimation position until a termination condition is satisfied. For example, the correcting unit 144 ends the processing when the number of modification of the modified estimation position reaches a predetermined number or more. The correcting unit 144 can determine a direction and an amount of modification to be made when modifying the modified estimation position at random, or can modify the modified estimation position according to predetermined modification rules.

The correcting unit 144 refers to the recalculation table 133, and identifies region identification information with which the Eval value is maximized. The correcting unit 144 registers position coordinates of each person corresponding to the identified region identification information in the tracking table 132 as position coordinates of each person at time t.

When registering position coordinates of each person at time t in the tracking table 132, the evaluating unit 143 and the correcting unit 144 described above register position information associating with each person identification information. The evaluating unit 143 evaluates person identification information corresponding to position coordinates based on features of a person region at time t-1 and the similarity to a person region based on position coordinates at time t. Moreover, the evaluating unit 143 and the correcting unit 144 register information of a person region of time t in the tracking table 132. For example, the information of a person region is a predetermined region based on position coordinates of time t.

Next, a procedure of processing performed by the image processing apparatus 100 according to the first embodiment is explained. FIG. 11 is a flowchart indicating the procedure of the processing performed by the image processing apparatus according to the first embodiment. As indicated in FIG. 11, the estimating unit 142 of the image processing apparatus 100 performs the background subtraction (step S101). The estimating unit 142 determines whether a person is included in image data of a previous time (step S102). When a person is not included in the image data (step S102: NO), the estimating unit 142 shifts to step S101.

On the other hand, when a person is included in the image data of the previous time (step S102: YES), the estimating unit 142 calculates an estimation position of the person (step S103). The estimating unit 142 evaluates the estimation position (step S104), and tentatively determines a position of the person of a current time (step S105).

The evaluating unit 143 of the image processing apparatus 100 reevaluates the tentative position of each person (step S106). When determining not to perform recalculation (step S107: NO), the evaluating unit 143 shifts to step S109. On the other hand, when determining to perform recalculation (step S107: YES), the correcting unit 144 recalculates the position of each person (step S108). The evaluating unit 143 or the correcting unit 144 registers information about a position of a person of the current time in the tracking table 132 (step S109).

Figure 12:
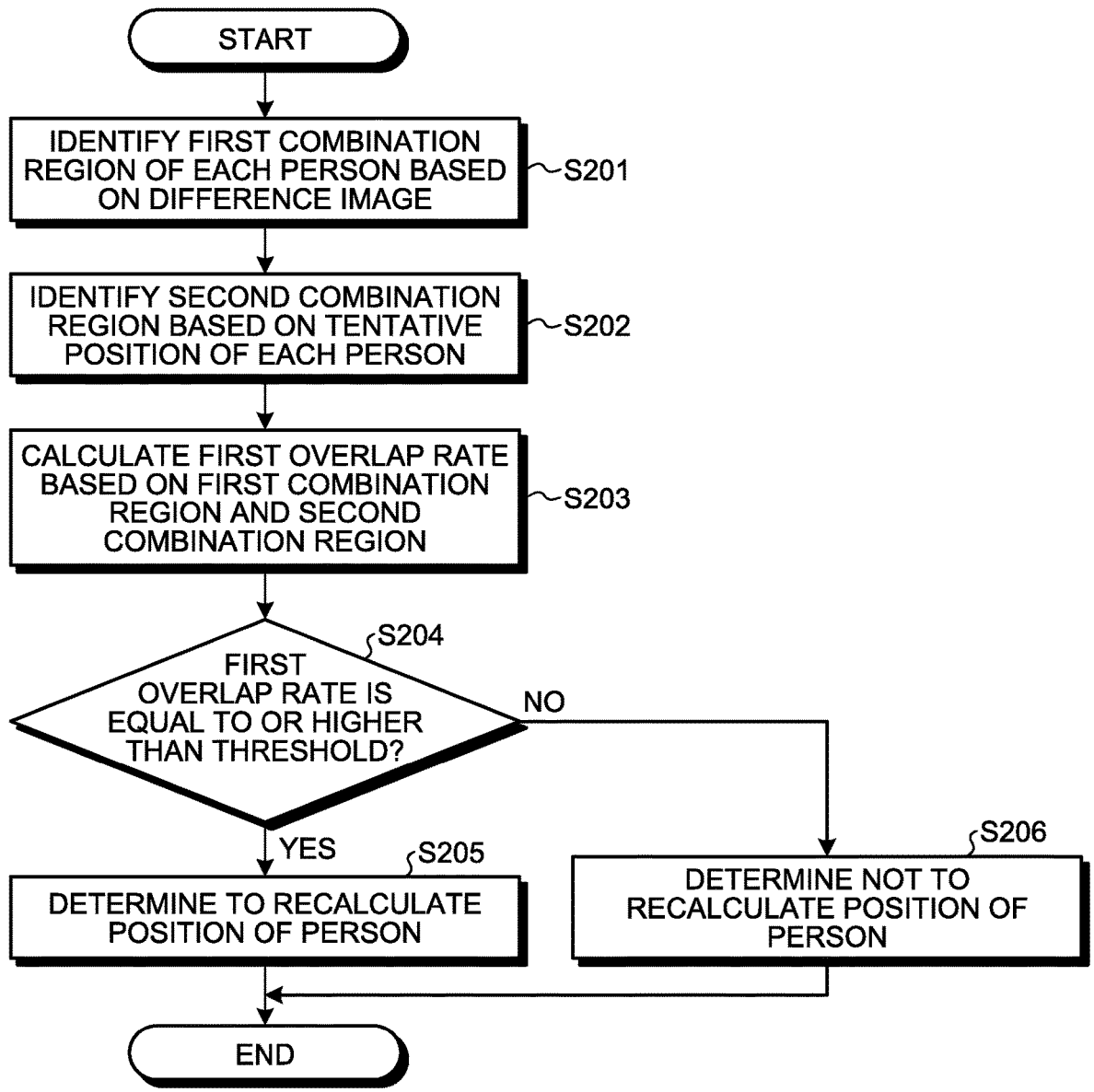
FIG. 12 is a flowchart indicating processing of reevaluation of a tentative position of each person.

Next, one example of processing of the reevaluation of a tentative position of each person indicated at step S106 in FIG. 11 is explained. FIG. 12 is a flowchart indicating the processing of reevaluation of a tentative position of each person. As indicated in FIG. 12, the evaluating unit 143 of the image processing apparatus 100 identifies the first combination region of each person based on a difference image (step S201).

The evaluating unit 143 identifies the second combination region based on a tentative position of each person (step S202). The evaluating unit 143 calculates the first overlap rate based on the first combination region and the second combination region (step S203).

The evaluating unit 143 determines whether the first overlap rate is equal to or higher than a threshold (step S204). When the first overlap rate is equal to or higher than the threshold (step S204: YES), the evaluating unit 143 determines to recalculate the position of the person (step S205). When the first overlap rate is lower than the threshold (step S204: NO), the evaluating unit 143 determines not to recalculate the position of the person (step S206).

Figure 13:
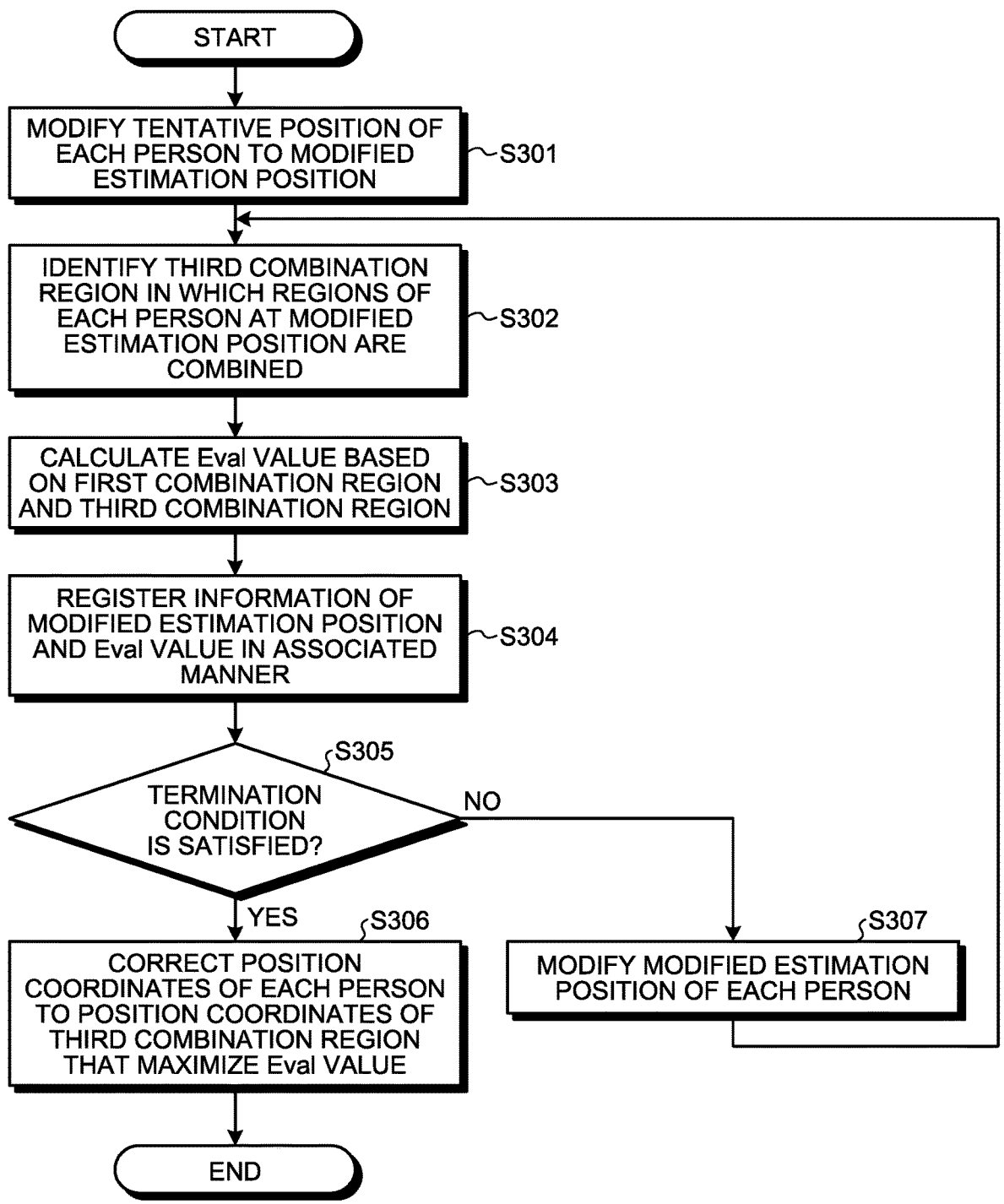
FIG. 13 is a flowchart indicating processing of recalculation of a position of each person.

Next, one example of processing of the recalculation of a position of each person indicated at step S108 in FIG. 11 is explained. FIG. 13 is a flowchart indicating processing of the recalculation of a position of each person. As indicated in FIG. 13, the correcting unit 144 of the image processing apparatus 100 modifies a tentative position of each person to a modified estimation position (step S301).

The correcting unit 144 identifies the third combination region in which regions at the modified estimation position of each person are combined (step S302). The correcting unit 144 calculates the Eval value based on the first combination region and the third combination region (step S303).

The correcting unit 144 registers information of the modified estimation position and the Eval value in an associated manner in the recalculation table 133 (step S304). The correcting unit 144 determines whether the termination condition is satisfied (step S305). When the termination condition is not satisfied (step S305: NO), the correcting unit 144 modifies the modified estimation position of each person (step S307), and shifts to step S302.

On the other hand, when the termination condition is satisfied (step S305: YES), the correcting unit 144 corrects position coordinates of each person to position coordinates of the third combination region that maximize the Eval value (step S306).

Next, an effect of the image processing apparatus 100 according to the first embodiment is explained. The image processing apparatus 100 corrects a tentative position of each person when the first overlap rate of the first combination region acquired by the background subtraction and the second combination region in which person regions according to the tentative position of each person are combined is lower than a predetermined overlap rate. Therefore, a tentative position of each person can be appropriately evaluated, and corrected according to an evaluation result. Thus, tracking of more than one person can be performed accurately.

Having evaluated that correction of a tentative position of each person is to be performed, the image processing apparatus 100 searches for a modified estimation position that maximizes the Eval value, and determines the searched modified estimation positions to positions of respective persons of the current time. Thus, a position of each person of the current time can be appropriately corrected.

[b] Second Embodiment

Next, an image processing apparatus according to a second embodiment is explained. Although illustration is omitted, the image processing apparatus according to the second embodiment is connected to the cameras 5a and 5b, similarly to the image processing apparatus 100.

Figure 14:
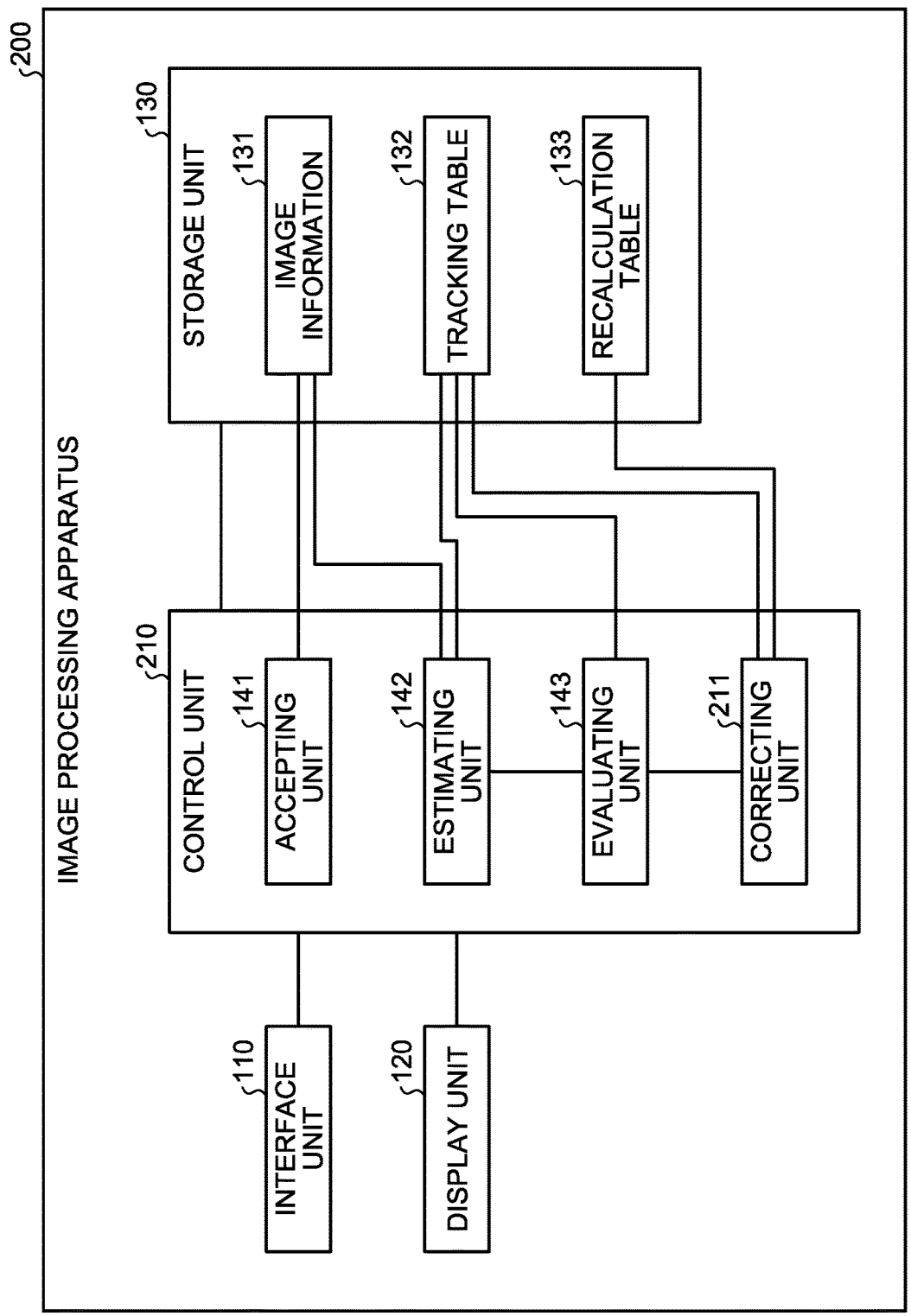
FIG. 14 is a functional block diagram depicting a configuration of an image processing apparatus according to a second embodiment.

FIG. 14 is a functional block diagram depicting a configuration of the image processing apparatus according to the second embodiment. As depicted in FIG. 14, an image processing apparatus 200 includes the interface unit 110, the display unit 120, the storage unit 130, and a control unit 210. Out of these components, explanation of the interface unit 110, the display unit 120, and the storage unit 130 is the same as the explanation of the interface unit 110, the display unit 120, and the storage unit 130 depicted in FIG. 2.

The control unit 210 includes the accepting unit 141, the estimating unit 142, the evaluating unit 143, and a correcting unit 211. Out of these components, explanation of the accepting unit 141, the estimating unit 142, and the evaluating unit 143 is the same as the explanation of the accepting unit 141, the estimating unit 142, and the evaluating unit 143 depicted in FIG. 2. The control unit 210 can be implemented by a CPU, an MPU, or the like. Moreover, the control unit 210 can be implemented also by a hardwired logic such as an ASIC and an FPGA.

The correcting unit 211 is a processing unit that corrects a tentative position of each person when the evaluating unit 143 evaluates that the tentative position of each person is not at an appropriate position. For example, the correcting unit 211 identifies an estimation position of each person that maximizes the Eval value indicated in Equation (4), and corrects the tentative position to the identified estimation position.

Figure 15:
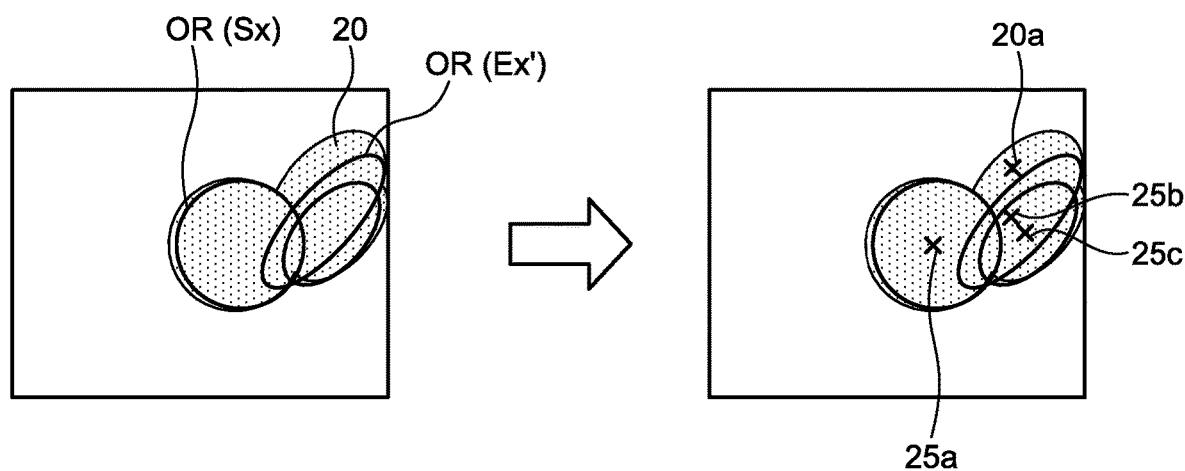
FIG. 15 is a diagram for explaining processing performed by a correcting unit according to the second embodiment.

In this example, instead of modifying estimation positions of all persons, the correcting unit 211 modifies an estimation position of a single person that satisfies a predetermined condition, and calculates the Eval value. FIG. 15 is a diagram for explaining processing performed by the correcting unit according to the second embodiment. As depicted in FIG. 15, the correcting unit 211 compares the first combination region OR(Sx) in which the first candidate regions of each person are combined and the third combination region OR(Ex') in which person regions according to tentative positions (or modified estimation positions) of each person are combined. The correcting unit 211 identifies a difference region 20 of the first combination region OR(Sx) and the third combination region OR (Ex').

The correcting unit 211 compares a center of gravity of the difference region 20 and a center of gravity of each person region, and modifies the estimation position of a person region closest to the center of gravity of the difference region 20 out of the center of gravities of the respective person regions. In the example depicted in FIG. 15, the center of gravity closest to the center of gravity of the difference region 20 among centers of gravity 25a, 25b, and 25c is the center of gravity 25d. The correcting unit 211 modifies the estimation position of the position region of the center of gravity 25b, and leaves the estimation positions of the other persons without modifying. For example, the correcting unit 211 corrects the estimation position of the person that satisfied the predetermined condition toward a direction of a center of gravity 20a of the difference region, by a predetermined distance.

Next, an effect of the image processing apparatus 200 according to the second embodiment is explained. The image processing apparatus 200 identifies a region of a person for which the estimation position is to be modified, and calculated the Eval value thereof based on a center of gravity of a difference image, instead of modifying estimation positions of all persons. Therefore, the modification of an estimation position to increase the Eval value can be minimized, and a tentative position can be corrected more efficiently.

[c] Third Embodiment

Next, an image processing apparatus according to a third embodiment is explained. Although illustration is omitted, the image processing apparatus according to the third embodiment is connected to the cameras 5a and 5b, similarly to the image processing apparatus 100.

Figure 16:
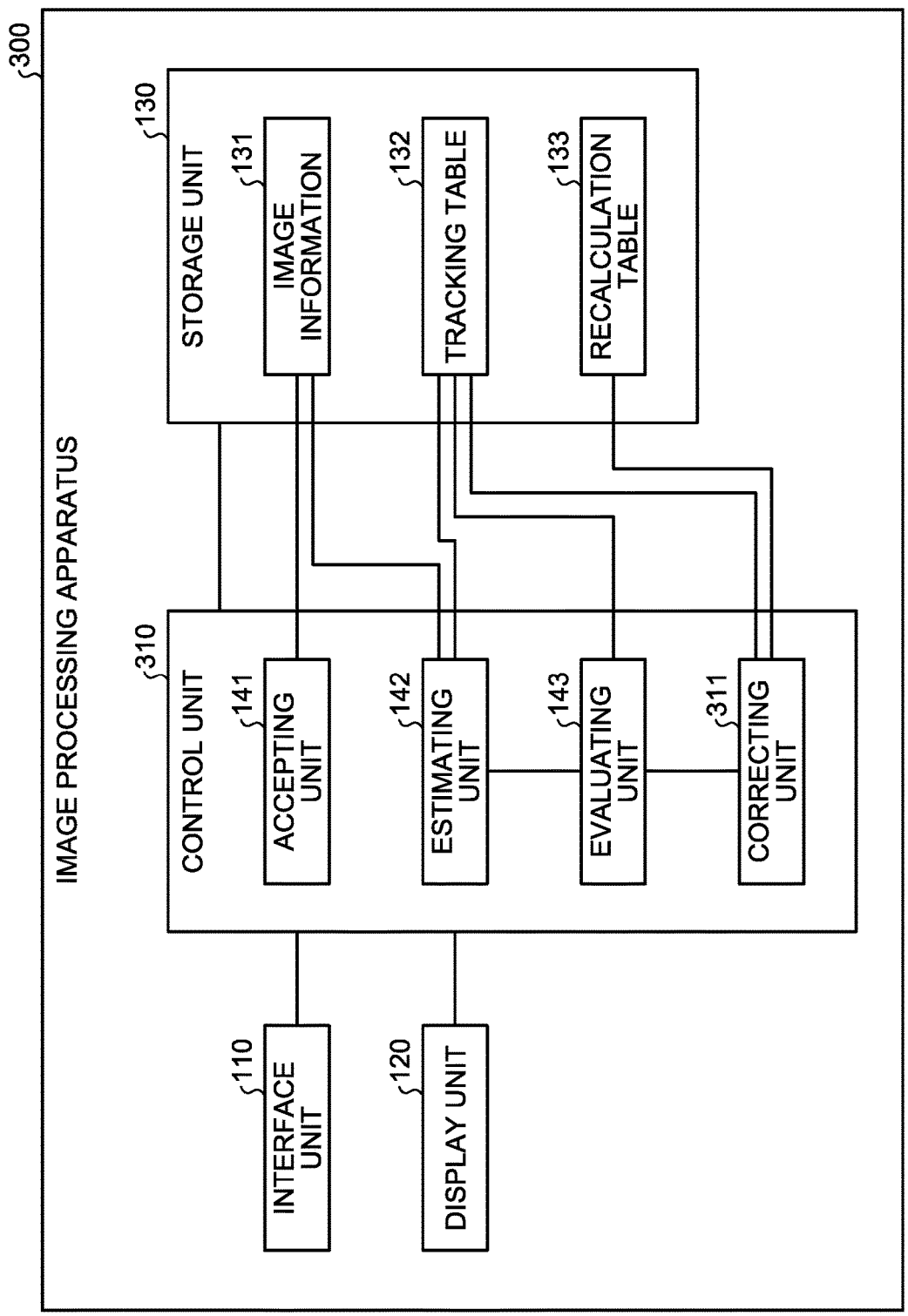
FIG. 16 is a functional block diagram depicting a configuration of an image processing apparatus according to a third embodiment.

FIG. 16 is a functional block diagram depicting a configuration of the image processing apparatus according to the third embodiment. As depicted in FIG. 16, an image processing apparatus 300 includes the interface unit 110, the display unit 120, the storage unit 130, and a control unit 310. Out of these components, explanation of the interface unit 110, the display unit 120, and the storage unit 130 is the same as the explanation of the interface unit 110, the display unit 120, and the storage unit 130 depicted in FIG. 2.

The control unit 310 includes the accepting unit 141, the estimating unit 142, the evaluating unit 143, and a correcting unit 311. Out of these components, explanation of the accepting unit 141, the estimating unit 142, and the evaluating unit 143 is the same as the explanation of the accepting unit 141, the estimating unit 142, and the evaluating unit 143 depicted in FIG. 2. The control unit 310 can be implemented by a CPU, an MPU, or the like. Moreover, the control unit 310 can be implemented also by a hardwired logic such as an ASIC and an FPGA.

The correcting unit 311 is a processing unit that corrects a tentative position of each person when the evaluating unit 143 evaluates that the tentative position of each person is not at an appropriate position. For example, the correcting unit 311 identifies an estimation position of each person that maximizes the Eval value indicated in Equation (4), and corrects the tentative position to the identified estimation position, similarly to the first embodiment.

The correcting unit 311 extracts a feature region of a person from image data of time t-1 and before, and detects a region corresponding to the feature region of this person from image data of time t. The correcting unit 311 corrects a position of a person according to the region detected from the image data of time t.

Figure 17:
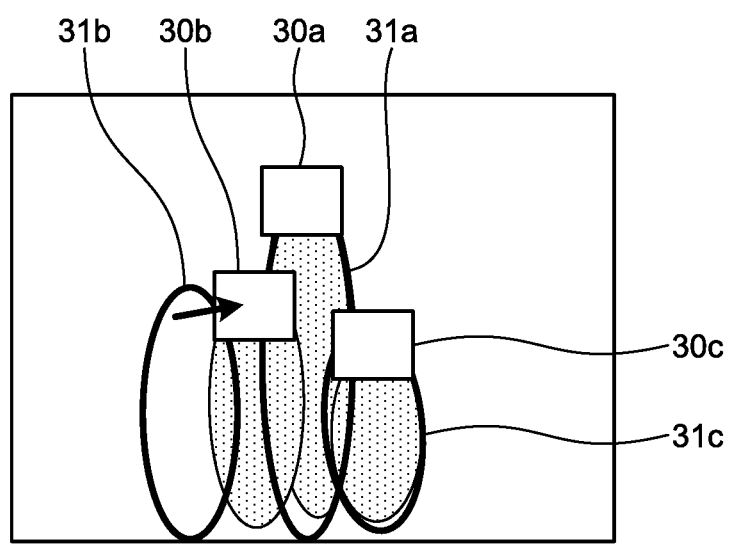
FIG. 17 is a diagram for explaining processing performed by a correcting unit according to the third embodiment.

FIG. 17 is a diagram for explaining processing performed by the correcting unit according to the third embodiment. In this example, a feature region of a person is a face region. For example, regions corresponding to person A, person B, and person C that have been extracted from the image data of time t-1 are denoted as regions 30a, 30b, and 30c, respectively. Furthermore, person regions of persons A, B, C according to tentative positions are denoted as person regions 31a, 31b, and 31c. The correcting unit 311 adjusts positions of the person regions 31a to 31c such that regions corresponding to faces of the person regions 31a to 31c are at the regions 30a, 30b, and 30c, thereby correcting the tentative positions. In example depicted in FIG. 17, the regions corresponding to faces in the person regions 31a and 31c are positioned at the regions 30a and 30c. Therefore, the correcting unit 311 corrects the person region 31b such that the region corresponding to the face in the person region 31b is positioned at the region 30b. A center of gravity of the person region 31b after the correction is the position of person B after correction.

Next, an effect of the image processing apparatus 300 according to the third embodiment is explained. The image processing apparatus 300 extracts a feature region of a person from image data of time t-1 and before, detects a region corresponding to the feature region of this person from the image data of time t, and corrects the position of the person according to the region detected from the image data of time t. Thus, a tentative position can be corrected more efficiently. The processing according to the third embodiment uses a face image, it is effective also when people wearing similar clothes are included, or when the similarity is not acquired properly.

[d] Fourth Embodiment

Next, an image processing apparatus according to a fourth embodiment is explained. Although illustration is omitted, the image processing apparatus according to the fourth embodiment is connected to cameras 5a, 5b, and 5c. The cameras 5a, 5B, and 5c have different imaging conditions, such as an installation position and an imaging direction, from each other.

Figure 18:
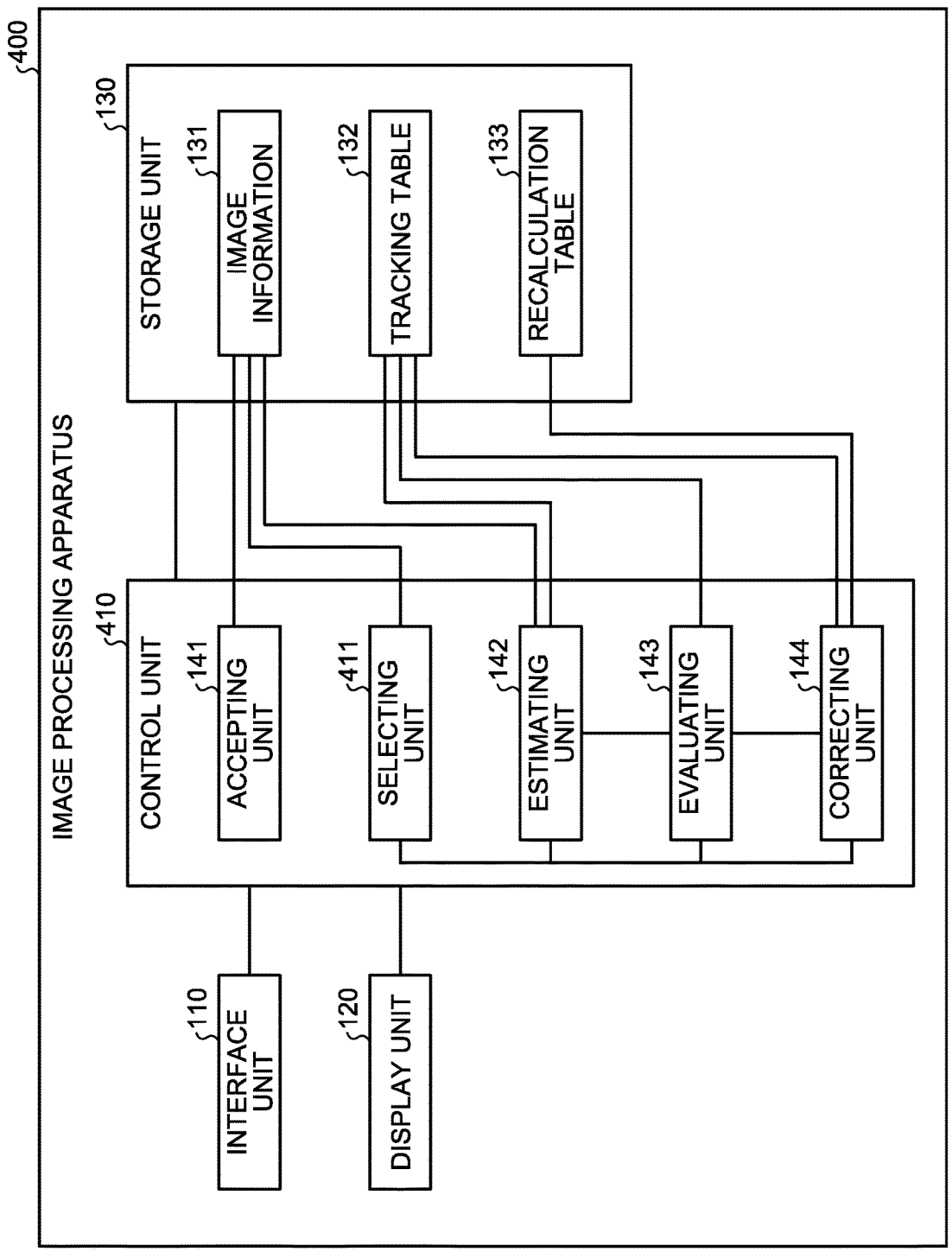
FIG. 18 is a functional block diagram depicting a configuration of an image processing apparatus according to a fourth embodiment.

FIG. 18 is a functional block diagram depicting a configuration of the image processing apparatus according to the fourth embodiment. As depicted in FIG. 18, an image processing apparatus 400 includes the interface unit 110, the display unit 120, the storage unit 130, and a control unit 410. Out of these components, explanation of the interface unit 110, the display unit 120, and the storage unit 130 is the same as the explanation of the interface unit 110, the display unit 120, and the storage unit 130 depicted in FIG. 2.

The control unit 410 includes the accepting unit 141, a selecting unit 411, the estimating unit 142, the evaluating unit 143, and the correcting unit 144. Out of these components, explanation of the accepting unit 141, the estimating unit 142, the evaluating unit 143, and the correcting unit 144 is the same as the explanation of the accepting unit 141, the estimating unit 142, the evaluating unit 143, and the correcting unit 144 depicted in FIG. 2. The control unit 410 can be implemented by a CPU, an MPU, or the like. Moreover, the control unit 410 can be implemented also by a hardwired logic such as an ASIC and an FPGA.

The selecting unit 411 is a processing unit that selects image data when identifying an estimation position of a person for each person. The selecting unit 411 selects image data of the best picture per person out of image data acquired by the cameras 5a, 5b, and 5c. The estimating unit 142, the evaluating unit 143, and the correcting unit 144 perform the processing using the image data selected by the selecting unit 411. For example, the selecting unit 411 selects image data that has the largest person region thereamong as the image data of the best picture.

Figure 19:
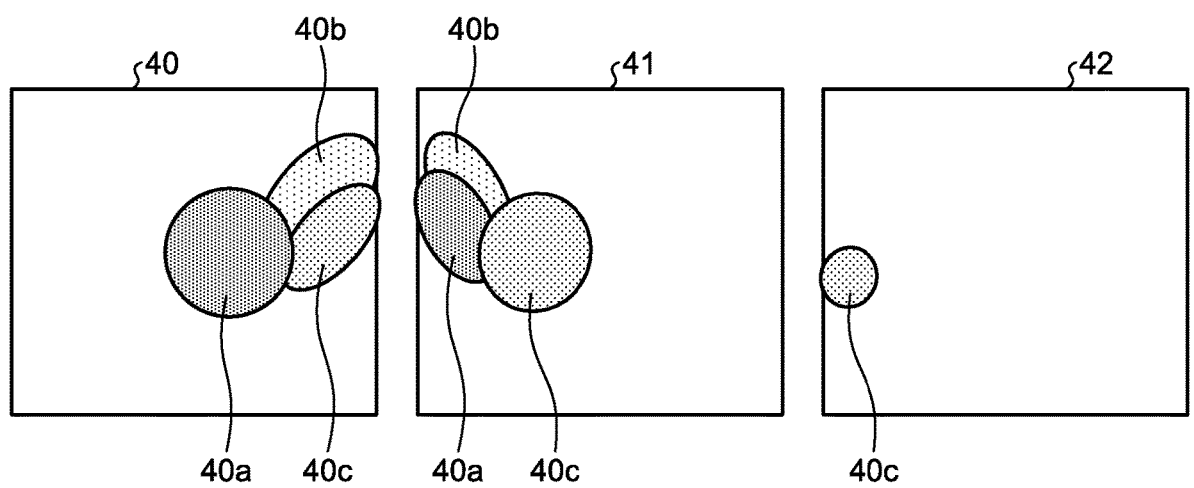
FIG. 19 is a diagram for explaining processing performed by a selecting unit according to the fourth embodiment.

FIG. 19 is a diagram for explaining processing performed by the selecting unit according to the fourth embodiment. In FIG. 19, respective pieces of image data 40, 41, and 42 are image data acquired by the camera 5a, 5b, and 5c, respectively at the same time. For example, it is assumed that persons A, B, and C are present, and regions 40a, 40b, and 40c of person A, B, and C are included in the respective image data 40, 41, and 42 (the regions 40a and 40b are not present in the image data 42).

Comparing the regions 40a to 40c in the image data 40, 41, and 42, as for persons A and B, the regions 40a and 40b in the image data 40 are the largest, and as for person C, the region 40c in the image data 40 is the largest. Therefore, the selecting unit 411 selects the image data 40 acquired by the camera 5a as image data for tracking persons A and B. the selecting unit 411 selects the image data 41 acquired by the camera 5b as image data for tracking person C. The selecting unit 411 informs identification of a camera that has acquired the selected image data to the estimating unit 142, the evaluating unit 143, and the correcting unit 144.

For example, the estimating unit 142, the evaluating unit 143, and the correcting unit 144 perform tracking processing by using the image data imaged by the camera selected by the selecting unit 411. The selecting unit 411 can perform the processing at predetermined time intervals determined by a user in advance.

Next, an effect of the image processing apparatus 400 according to the fourth embodiment is explained. When tracking of a person is performed, the image processing apparatus 400 according to the fourth embodiment uses image data of the best picture of the person from among multiple pieces of image data of the same time. Therefore, an estimation position of the person can be accurately determined.

Although for the image processing apparatuses 100 to 400, an example of including the control units 140 to 410 and the storage unit 130 in a single unit of apparatus has been given, not limited thereto, they can be provided in different apparatuses separately.

Figure 20:
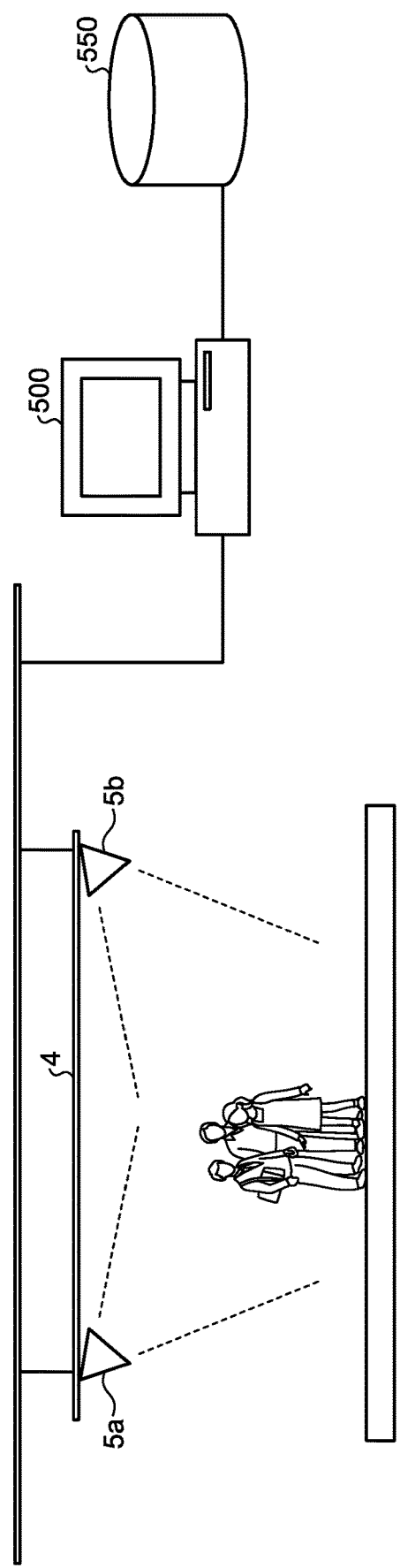
FIG. 20 depicts one example of an image processing system.

FIG. 20 depicts one example of an image processing system. As depicted in FIG. 20, the image processing system includes the cameras 5a and 5b, an image processing apparatus 500, and a data storage 550. The image processing apparatus 500 performs processing corresponding to the control units 140 to 410 described in the first to the fourth embodiments. The data storage 550 holds information corresponding to the storage unit 130 described in the first to the fourth embodiments. Furthermore, the processing corresponding to the respective processing units included in the control units 140 to 410 can be distributed to multiple servers, and can perform the processing corresponding to the image processing apparatuses 100 to 400 by causing the servers to cooperate with each other.

Figure 21:
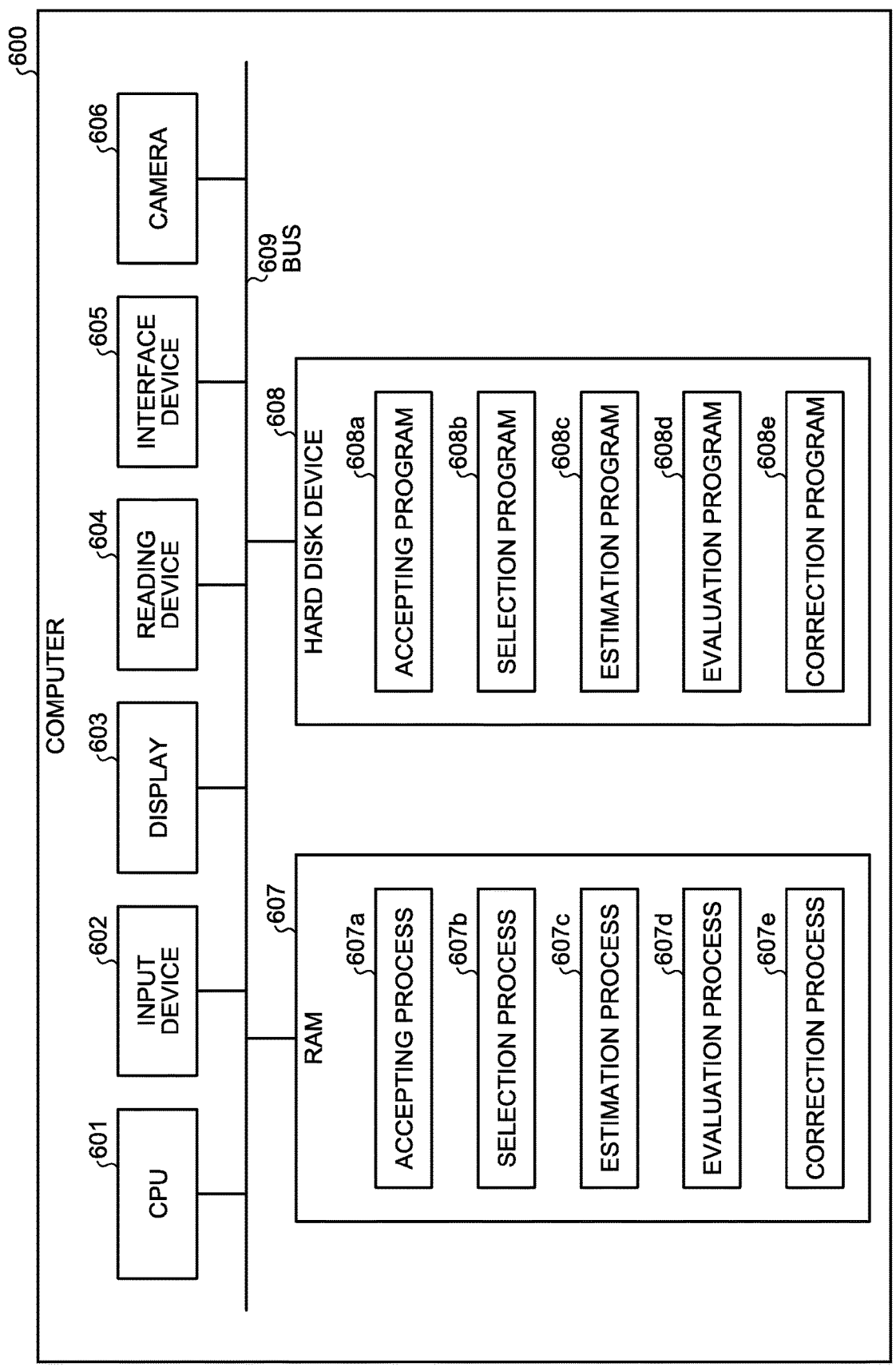
FIG. 21 depicts one example of a hardware configuration of a computer that implements functions similar to those of the image processing apparatus.

Next, one example of a hardware configuration of a computer that implements functions similar to those of the image processing apparatuses 100 to 400 described in the above embodiments is explained. FIG. 21 depicts one example of the hardware configuration of the computer that implements the functions similar to those of the image processing apparatus.

As depicted in FIG. 21, a computer 600 includes a CPU 601 that performs various kinds of arithmetic processing, an input device 602 that accepts an input of data from a user, and a display 603. Moreover, the computer 600 includes a reading device 604 that reads a program and the like from a storage medium, an interface device 605 that communicates data with other computers through a network, and a camera 606. Furthermore, the computer 600 includes a RAM 607, and a hard disk device 608 that temporarily stores various kinds of information. The respective devices 601 to 608 are connected to a bus 609.

The hard disk device 608 has an accepting program 608a, a selection program 608b, an estimation program 608c, an evaluation program 608d, and a correction program 608e. The CPU 601 reads the accepting program 608a, the selection program 608b, the estimation program 608c, the evaluation program 608d, and the correction program 608e, and develops them on the RAM 607.

The accepting program 608a functions as an accepting process 607a. The selection program 608b functions as a selection process 607b. The estimation program 608c functions as an estimation process 607c. The evaluation program 608d functions as an evaluation process 607d. The correction program 608e functions as a correction process 607e.

Processing of the accepting process 607a corresponds to the processing of the accepting unit 141. Processing of the selection process 607b corresponds to the processing of the selecting unit 411. Processing of the estimation process 607c corresponds to the processing of the estimating unit 143. Processing of the evaluating unit 607d corresponds to the processing of the evaluating unit 143. Processing of the correction process 607e corresponds to processing of the correcting units 144, 211, and 311.

For example, having been stored in a "portable physical medium" such as a flexible disk (FD), a compact disk read-only memory (CD-ROM), a digital versatile disk (DVD), a magneto-optical disk, and an integrated circuit (IC) card inserted into the computer 600, the respective programs 608a to 608e can be read by the computer 600 therefrom to be executed.

Accurate tracking of more than one object is enabled.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing system comprising:
 a camera;
 a storage device; and
 an image processing apparatus, wherein
 the storage device stores a plurality of captured images that are captured by the camera, and
 the image processing apparatus comprises
 a processor that executes a process, the process comprising:
   estimating a position of an image region of an object included in a captured image of a current time for each of a plurality of objects included in the captured image of the current time based on a captured image of a previous time, the captured image of the current time and the captured image of the previous time being acquired from the storage device,
   evaluating whether to correct the estimated position of each of the image regions of the objects estimated by the estimating, based on a combination image region in which the respective image regions of the objects are combined, and on a difference image region identified from a background image and the captured image of the current time, and correcting the estimated positions of each of the image regions of the objects estimated by the estimating based on the evaluating.

2. The image processing system according to claim 1, wherein the correcting searches for a position of the combination image region that maximizes a parameter considering a similarity between an image of a second combination image region in which image regions of the objects in the captured image of the previous time that correspond to the respective image regions of the objects estimated by the estimating are combined and an image of the combination image region, and an overlap rate of the combination image region and the difference image region while displacing a search position of the combination image region, and determines the searched position of the combination image region as the corrected respective estimated positions of each of the image regions of the objects estimated by the estimating.

3. The image processing system according to claim 2, wherein the correcting compares a position of a first center of gravity of an image region in an image, the image region corresponding to a portion of the image where the combination image region does not overlap with the difference image, with each of respective positions of second centers of gravity of the image regions of the respective objects, identifies an image region of an object having a position of the second center of gravity that is closest to the position of the first center of gravity from among the respective positions of the second centers of gravity of the image regions of the objects estimated by the estimating, and corrects the estimated position of the identified image region of the object.

4. The image processing system according to claim 2, wherein the correcting corrects the estimated position of the image region of each of the objects estimated by the estimating, by using a feature image region of the object included in the captured image.

5. The image processing system according to claim 1, the process further comprising selecting a captured image that has a largest image region of an object from among a plurality of captured images that are captured at a same time by a plurality of cameras having different imaging conditions, wherein the estimating, the evaluating, and the correcting use the image selected by the selecting as the captured image of the current time.

6. An image processing apparatus comprising:
a processor that executes a process comprising:
estimating a position of an image region of an object included in a captured image of a current time for each of a plurality of objects included in the captured image of the current time based on a captured image of a previous time, evaluating whether to correct the estimated position of each of the image regions of the objects estimated by the estimating, based on a combination image region in which the respective image regions of the objects are combined, and on a difference image region identified from a background image and the captured image of the current time, and correcting the respective estimated positions of each of the image regions of the objects estimated by the estimating based on by the evaluating.

7. The image processing apparatus according to claim 6, wherein the correcting searches for a position of the combination image region that maximizes a parameter considering a similarity between an image of a second combination image region in which image regions of objects in the captured image of the previous time that correspond to the respective image regions of the objects estimated by the estimating are combined and an image of the combination image region, and an overlap rate of the combination image region and the difference image region while displacing a search position of the combination image region, and determines the searched position of the combination image region as the corrected respective estimated positions of each of the image regions of the objects estimated by the estimating.

8. The image processing apparatus according to claim 7, wherein the correcting compares a position of a first center of gravity of an image region in an image, the image region corresponding to a portion of the image where the combination image region does not overlap with the difference image, with each of respective positions of second centers of gravity of the image regions of the respective objects, identifies an image region of an object having a position of the second center of gravity that is closest to the position of the first center of gravity from among the respective positions of the second centers of gravity of the image regions of the objects estimated by the estimating, and corrects the estimated position of the identified image region of the object.

9. The image processing apparatus according to claim 7, wherein the correcting corrects the estimated position of the image region of each of the objects estimated by the estimating, by using a feature image region of the object included in the captured image.

10. The image processing apparatus according to claim 6, the process further comprising selecting a captured image that has a largest image region of an object from among a plurality of captured images that are captured at a same time by a plurality of cameras having different imaging conditions, wherein the estimating, the evaluating, and the correcting use the image selected by the selecting as the captured image of the current time.

11. An image processing method comprising:
estimating a position of an image region of an object included in a captured image of a current time for each of a plurality of objects included in the captured image of the current time based on a captured image of a previous time, using a processor;

evaluating whether to correct the estimated position of each of the image regions of the object, based on a combination image region in which the respective estimated image regions of the objects are combined, and on a difference image region that is identified from a background image and the captured image of the current time, using the processor; and correcting the respective estimated positions of each of the image regions of the objects based on the evaluating, using the processor.

12. The image processing method according to claim 11, wherein the correcting searches for a position of the combination image region that maximizes a parameter considering a similarity between an image of a second combination image region in which image regions of objects in the captured image of the previous time that correspond to the respective image regions of objects estimated by the estimating are combined and an image of the combination image region, and an overlap rate of the combination image region and the difference image region while displacing a search position of the combination image region, and includes determining the searched position of the combination image region as the corrected respective estimated positions of each of the image regions of the objects estimated by the estimating.

13. The image processing method according to claim 12, wherein the correcting compares a position of a first center of gravity of an image region in an image, the image region corresponding to a portion of the image where the combination image region does not overlap with the difference image, with each of respective positions of second centers of gravity of the image regions of the respective objects, identifies an image region of an object having a position of the second center of gravity that is closest to the position of the first center of gravity from among the respective positions of the second centers of gravity of the image regions of the objects estimated by the estimating, and corrects the estimated position of the identified image region of the object.

14. The image processing method according to claim 12, wherein the correcting corrects the estimated position of the estimated image region of each of the objects, by using a feature image region of the object included in the captured image.

15. The image processing method according to claim 11, further comprising selecting a captured image that has a largest image region of an object from among a plurality of captured images that are captured at a same time by a plurality of cameras having different imaging conditions, wherein the estimating, the evaluating, and the correcting use the image selected at the selecting as the captured image of the current time.

* * * * *